(12) United States Patent
Lincoln et al.

(10) Patent No.: US 11,492,967 B2
(45) Date of Patent: Nov. 8, 2022

(54) PARTICULATE INGESTION SENSOR FOR GAS TURBINE ENGINES

(71) Applicant: UNITED TECHNOLOGIES CORPORATION, Farmington, CT (US)

(72) Inventors: David L. Lincoln, Cromwell, CT (US); Wayde R. Schmidt, Pomfret Center, CT (US); Michael J. Birnkrant, Wethersfield, CT (US); Michael T. Gorski, Clinton, CT (US); Jonathan Gilson, W. Hartford, CT (US); Xuemei Wang, South Windsor, CT (US); Coy Bruce Wood, Ellington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 688 days.

(21) Appl. No.: 16/503,097

(22) Filed: Jul. 3, 2019

(65) Prior Publication Data
US 2021/0003075 A1    Jan. 7, 2021

(51) Int. Cl.
*F02C 7/055* (2006.01)
*F02C 7/052* (2006.01)
*F02C 9/16* (2006.01)

(52) U.S. Cl.
CPC .............. *F02C 7/055* (2013.01); *F02C 7/052* (2013.01); *F02C 9/16* (2013.01)

(58) Field of Classification Search
None
See application file for complete search history.

(56) References Cited

U.S. PATENT DOCUMENTS

| | | | |
|---|---|---|---|
| 4,888,948 A | 12/1989 | Fisher et al. | |
| 5,164,604 A | 11/1992 | Blair et al. | |
| 7,106,442 B2 | 9/2006 | Silcott et al. | |
| 7,518,710 B2 | 4/2009 | Gao et al. | |
| 8,013,994 B1 | 9/2011 | Vattiat et al. | |
| 9,909,971 B2 | 3/2018 | Knobloch et al. | |
| 9,915,600 B2 | 3/2018 | Walls et al. | |
| 10,018,551 B2 | 7/2018 | Walls et al. | |
| 10,063,794 B2 | 8/2018 | Prata et al. | |
| 10,458,990 B1 | 10/2019 | Manautou et al. | |
| 10,845,294 B1* | 11/2020 | Lincoln .................. | G01N 21/53 |

(Continued)

FOREIGN PATENT DOCUMENTS

| | | |
|---|---|---|
| DE | 102015117361 | 4/2016 |
| WO | 2016197259 | 12/2016 |

OTHER PUBLICATIONS

European Patent Office, European Search Report dated Nov. 13, 2020 in Application No. 20183102.1.

(Continued)

*Primary Examiner* — Daniel S Larkin
(74) *Attorney, Agent, or Firm* — Snell & Wilmer L.L.P.

(57) ABSTRACT

A multi-angle multi-wave array may comprise a first set of sensing elements, a second set of sensing elements, and a third set of sensing elements wherein the first set of sensing elements, the second set of sensing elements, and the third set of sensing elements are collectively configured to detect and discriminate between categories of foreign object debris including solid objects and particulates including silicate sand, water vapor, dust, volcanic ash, and smoke.

20 Claims, 9 Drawing Sheets

(56) References Cited

U.S. PATENT DOCUMENTS

| | | |
|---|---|---|
| 2002/0118352 A1 | 8/2002 | Ohzu et al. |
| 2005/0243307 A1 | 11/2005 | Silcott et al. |
| 2005/0259255 A1 | 11/2005 | Williams et al. |
| 2006/0285108 A1 | 12/2006 | Morrisroe |
| 2009/0079981 A1 | 3/2009 | Holve |
| 2009/0112519 A1 | 4/2009 | Novis et al. |
| 2010/0073173 A1 | 3/2010 | Zindy et al. |
| 2011/0179763 A1 | 7/2011 | Rajamani et al. |
| 2012/0229798 A1 | 9/2012 | Mocnik et al. |
| 2013/0025348 A1 | 1/2013 | Rajamani et al. |
| 2014/0330459 A1 | 11/2014 | Baumgardner et al. |
| 2015/0369722 A1 | 12/2015 | Donner |
| 2017/0276588 A1 | 9/2017 | Knox et al. |
| 2018/0068498 A1 | 3/2018 | Hodge |
| 2018/0136122 A1 | 5/2018 | Birnkrant et al. |
| 2018/0224373 A1 | 8/2018 | Lincoln et al. |
| 2018/0252654 A1 | 9/2018 | Lincoln et al. |
| 2018/0298778 A1 | 10/2018 | Dischinger et al. |
| 2019/0094415 A1 | 3/2019 | Essawy et al. |
| 2019/0221094 A1* | 7/2019 | Birnkrant ............ G01N 21/534 |

OTHER PUBLICATIONS

K. Chamaillard et al, "Light backscattering and scattering by nonspherical sea-salt aerosols", Journal of Quantitative Spectroscopy, and Radiative Transfer, vol. 79-80, Jun. 1, 2003 (Jun. 1, 2003), pp. 577-597.

H Volten et al, "Scattering matrices of mineral aerosol particles at 441.6 nm and 632.8 nm", Journal of Geophysical Research: Atmospheres, Aug. 16, 2001 (Aug. 16, 2001), pp. 17375-17401, Retrieved from the Internet: URL:http://dspace.ubvu.vu.nl/bitstream/han dle/1871/23357/224350.pdf?sequence=1.

USPTO, Notice of Allowance dated Aug. 26, 2020 in U.S. Appl. No. 16/503,057.

European Patent Office, European Search Report dated Sep. 4, 2020 in Application No. 20182692.2.

* cited by examiner

PARTICULATE INGESTION SENSOR FOR GAS TURBINE ENGINES

FIELD

The present disclosure relates to air quality sensors and, more specifically, to systems and methods for particulate detection in turbine engine gas path flow.

BACKGROUND

Gas turbine engine components and structures may be sensitive to Foreign Object Debris (FOD) such as, for example, particulate matter. When present in turbine engine gas path flows, particulate matter may tend to result in catastrophic engine failure. Relatively hard and/or dense FOD particles such as, for example, silicate sand, dust, rock, volcanic ash, and/or the like may impact and erode turbine components such as, for example, compressor blades and vanes. In this regard, FOD particles in turbine engine gas paths tend to decrease the operational life and reliability of gas turbine engines.

SUMMARY

In various embodiments, a multi-angle multi-wave array may comprise a first set of sensing elements, a second set of sensing elements, and a third set of sensing elements, wherein the first set of sensing elements, the second set of sensing elements, and the third set of sensing elements are collectively configured to detect and discriminate between categories of foreign object debris including solid objects and particulates including silicate sand, water vapor, dust, volcanic ash, and smoke.

In various embodiments, the first set of sensing elements comprises a first light sensor, a second light sensor, and a third light sensor each aligned along a common axis, and a first infrared light source and a first blue light source, wherein the first infrared light source and the first blue light source are each divided by the common axis and located circumferentially about a center defined by the second light sensor wherein the first infrared light source and the first blue light define, respectively, an angle θ1 and an angle θ2 between the common axis. In various embodiments, the first set comprises a second infrared light source and a second blue light source, wherein the second infrared light source and the second blue light source are each divided by the common axis and located circumferentially about the center defined by the second light sensor, wherein the second infrared light source and the second blue light define, respectively, an angle θ1' supplementary to the angle θ1 and an angle θ2' supplementary to the angle θ2.

In various embodiments, the first set comprises a third infrared light source and a third blue light source aligned along the common axis, wherein each of the third infrared light source and the third blue light source have a symmetry axis of a respective emitted light cone perpendicular to a plane defined by the first light sensor, the second light sensor, and the third light sensor. In various embodiments, the second set of sensing elements comprises at least one of a polarized light emitting element or a polarized light detecting element configured to operate at a wavelength between 400 nm and 2000 nm. In various embodiments, the third set of sensing elements comprises a first ultraviolet light emitting element and a first fluorescent light detecting element. In various embodiments, the third set comprises an X-ray emitting source and an X-ray fluorescence detector.

In various embodiments, a particulate sensor assembly comprises a housing having a sensor face, and a multi-angle multi-wave array comprising a first set of sensing elements, a second set of sensing elements, and a third set of sensing elements each distributed on the sensor face wherein the first set of sensing elements, the second set of sensing elements, and the third set of sensing elements are collectively configured to detect and discriminate between categories of foreign object debris including silicate sand, dust, rock, volcanic ash, sea-salt aerosol, and smoke.

In various embodiments, the first set of sensing elements comprises a first light sensor, a second light sensor, and a third light sensor each aligned along a common axis, and a first infrared light source and a first blue light source, wherein the first infrared light source and the first blue light source are each divided by the common axis and located circumferentially about a center defined by the second light sensor, wherein the first infrared light source and the first blue light define, respectively, an angle θ1 and an angle θ2 between the common axis. In various embodiments, the first set comprises a second infrared light source and a second blue light source, wherein the second infrared light source and the second blue light source are each divided by the common axis and located circumferentially about the center defined by the second light sensor, wherein the second infrared light source and the second blue light define, respectively, an angle θ1' supplementary to the angle θ1 and an angle θ2' supplementary to the angle θ2.

In various embodiments, the first set comprises a third infrared light source and a third blue light source aligned along the common axis, wherein each of the third infrared light source and the third blue light source have a symmetry axis of a respective emitted light cone perpendicular to a plane defined by the sensor face. In various embodiments, the second set of sensing elements comprises at least one of a polarized light emitting element or a polarized light detecting element configured to operate at a wavelength between 400 nm and 1100 nm. In various embodiments, the third set of sensing elements comprises a first ultraviolet light emitting element and a first fluorescent light detecting element. In various embodiments, the third set comprises an X-ray emitting source and an X-ray fluorescence detector.

In various embodiments, a gas turbine engine comprises a compressor section configured to compress a gas, a combustor section aft of the compressor section and configured to combust the gas, a turbine section aft of the combustor section and configured to extract work from the gas and a particulate sensor assembly configured to observe a sensing volume of a flow-path of the gas, comprising a housing having a sensor face, and a multi-angle multi-wave array comprising a first set of sensing elements, a second set of sensing elements, and a third set of sensing elements each distributed on the sensor face wherein the first set of sensing elements, the second set of sensing elements, and the third set of sensing elements are collectively configured to detect and discriminate between categories of foreign object debris including silicate sand, dust, rock, volcanic ash, sea-salt aerosol, and smoke.

In various embodiments, the gas turbine engine comprises an engine static structure having a lip defining an inlet, wherein the particulate sensor assembly is coupled to the engine static structure proximate the lip to observe a sensing volume defining an inlet ingestion sensing region. In various embodiments, the engine static structure further defines a bypass duct, wherein the particulate sensor assembly is coupled to the engine static structure to observe a sensing volume within a bypass flow-path proximate an inlet of the bypass duct. In various embodiments, the first set of sensing elements comprises a first light sensor, a second light sensor, and a third light sensor each aligned along a common axis, and a first infrared light source and a first blue light source, wherein the first infrared light source and the first blue light source are each divided by the common axis and located circumferentially about a center defined by the second light sensor, wherein the first infrared light source and the first blue light define, respectively, an angle θ1 and an angle θ2 between the common axis. In various embodiments, the second set of sensing elements comprises at least one of a polarized light emitting element or a polarized light detecting element configured to operate at a wavelength between 400 nm and 1100 nm. In various embodiments, the third set of sensing elements comprises a first ultraviolet light emitting element and a first fluorescent light detecting element.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
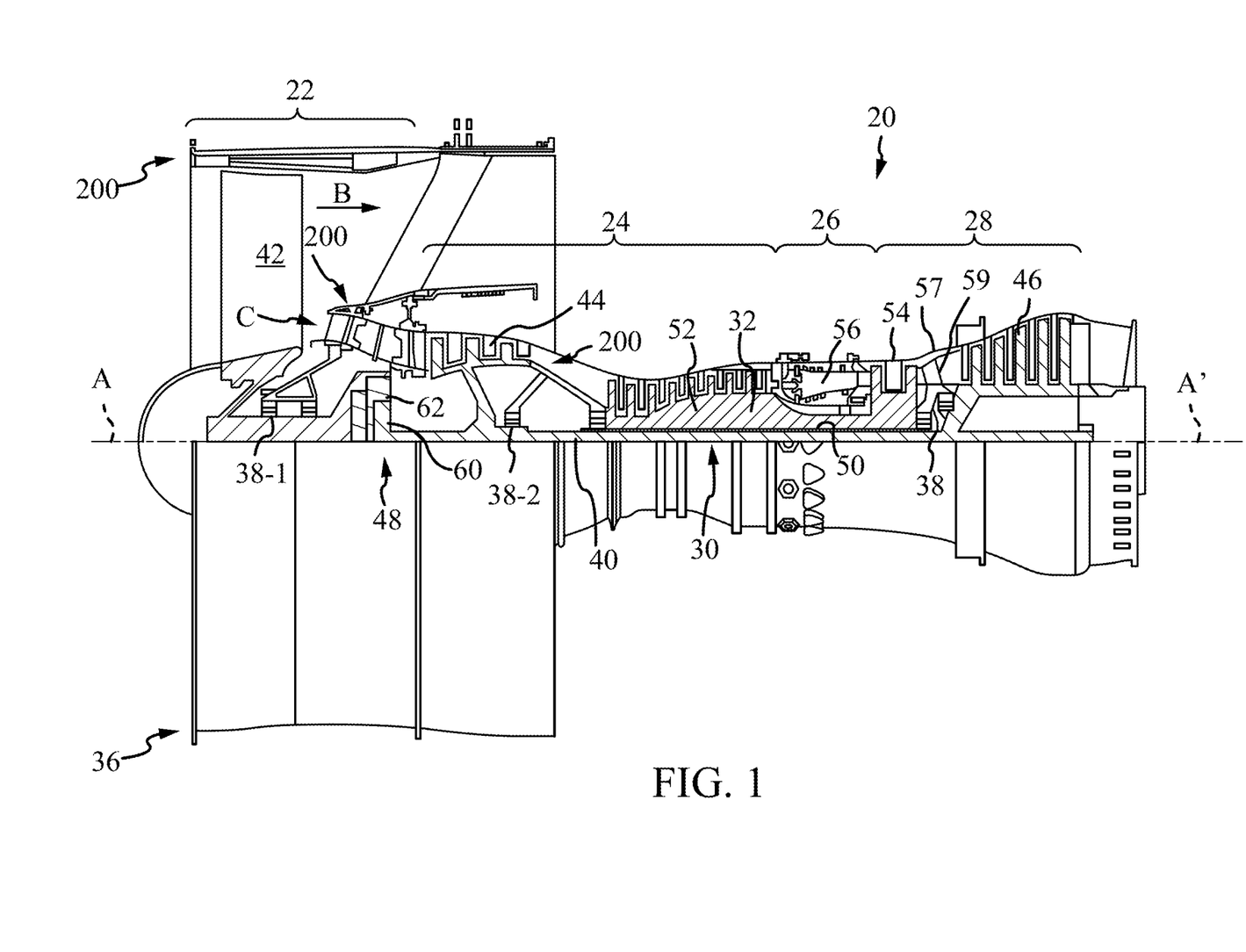
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air through a core flow-path C for compression and communication into combustor section 26 then expansion through turbine section 28. In various embodiments, a plurality of particulate sensor assemblies 200 may be located throughout the turbine engine 20 in the core flow-path C and/or the bypass flow-path B. Although depicted as a turbofan gas turbine engine 20 herein, it should be understood that the concepts described herein are not limited to use with turbofans as the teachings may be applied to other types of turbine engines including turbojet engines, a low-bypass turbofan, a high-bypass turbofan, or any other gas turbine known to those skilled in the art.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to as a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which is associated with higher pressure ratios and higher temperatures in the HPC 52. These higher operating temperatures and pressure ratios may create operating environments that may cause thermal loads that are higher than the thermal loads encountered in conventional turbofan engines, which may shorten the operational life of current components.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

Figure 2:
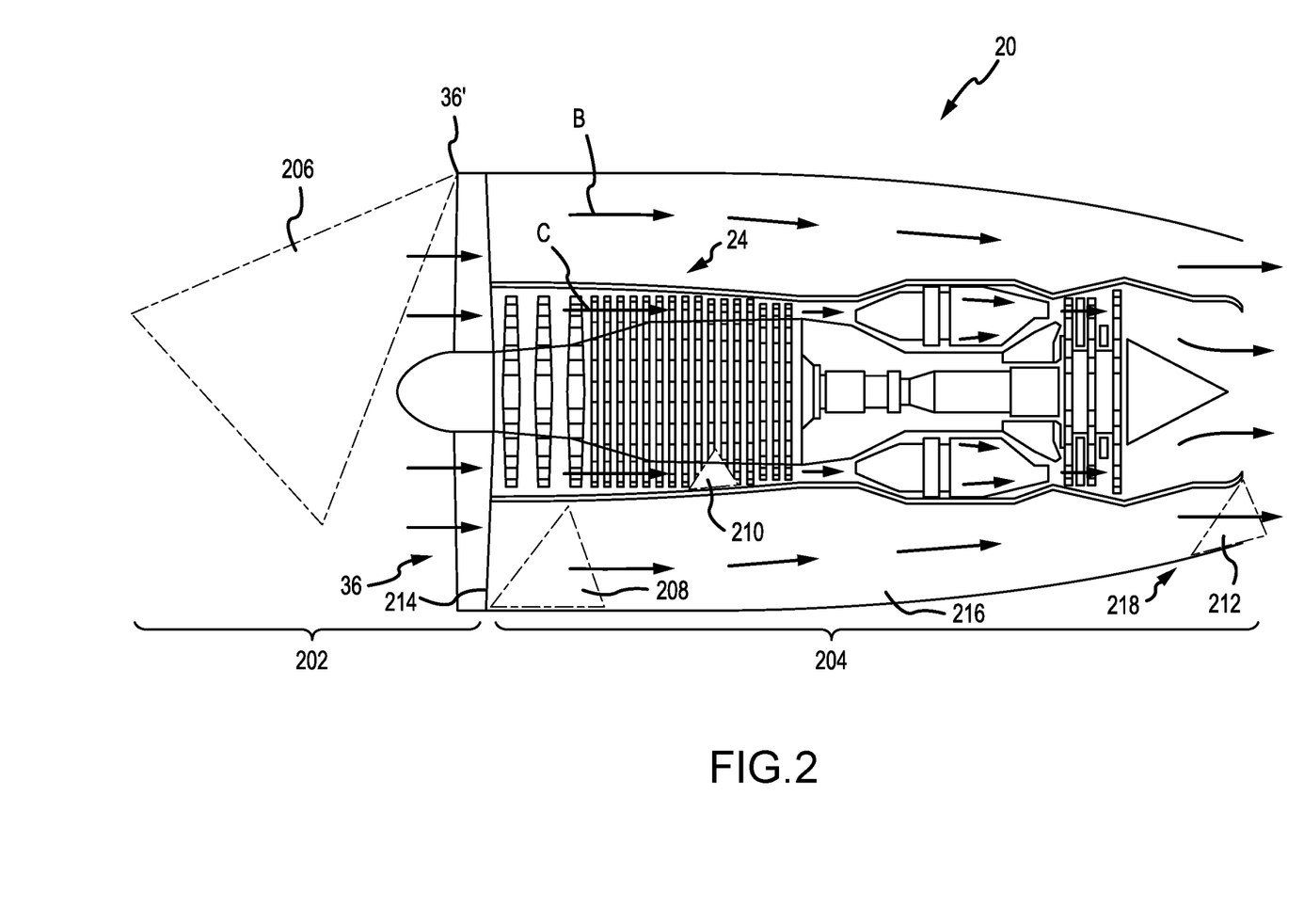
FIG. 2 illustrates particulate sensing volumes for particulate sensor assemblies in a gas turbine engine, in accordance with various embodiments.

With additional reference to FIG. 2, sensing volumes for particulate sensor assemblies 200 of turbine engine 20 are illustrated in various embodiments. Sensing volumes may be defined in an inlet ingestion sensing region 202 and a turbine gas path sensing region 204. For example, a first particulate sensor assembly may be coupled to engine static structure 36 proximate lip 36' to observe a first sensing volume 206 defining the inlet ingestion sensing region 202. A second particulate sensor assembly may be coupled to the engine static structure 36 to observe a second sensing volume 208 within bypass flow-path B proximate the inlet 214 of bypass duct 216. A third particulate sensor assembly may be coupled to compressor section 24 to observe a third sensing volume 210 within core flow-path C. A fourth particulate sensor assembly may be coupled proximate the exit 218 of bypass duct 216 to observe a fourth sensing volume 212 of the bypass flow-path B exhaust and/or the core flow-path C exhaust. It will be appreciated that any number of sensing volumes may be defined by a particulate sensor assembly configured for a particular area of interest.

Figure 3A:
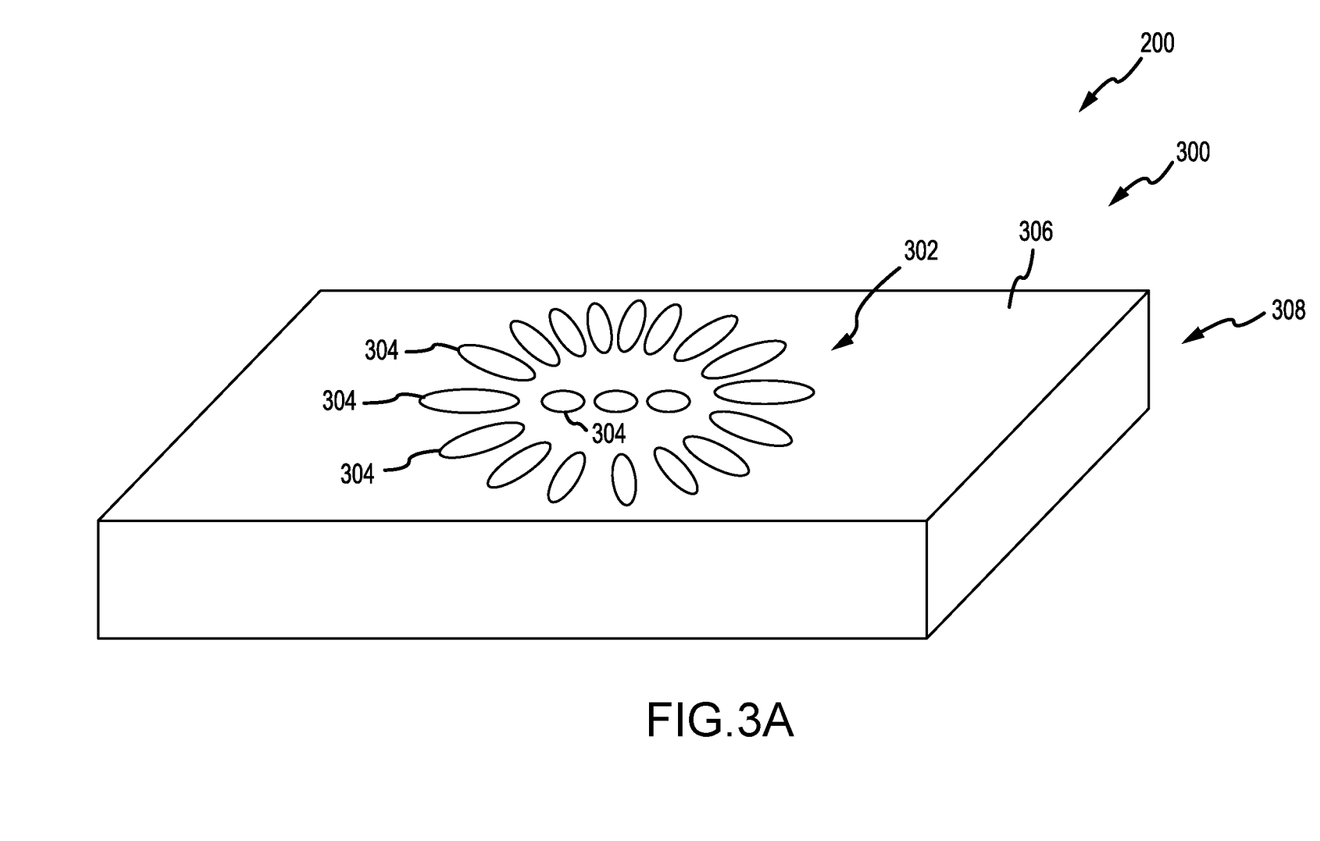
FIG. 3A illustrates a schematic diagram of a multi-angle, multi-wave array of a particulate sensor, in accordance with various embodiments.
Figure 3B:
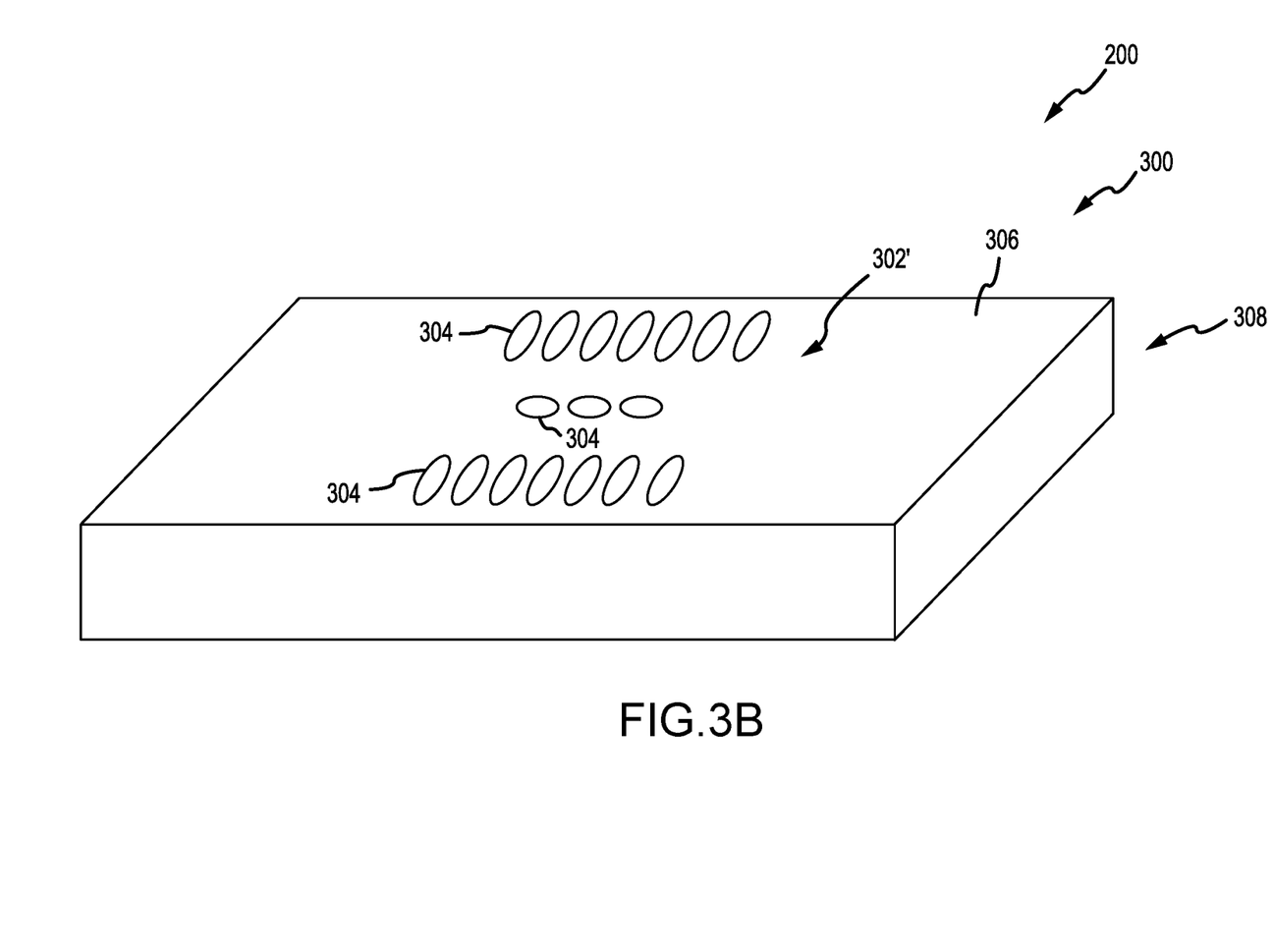
FIG. 3B illustrates a schematic diagram of a multi-angle, multi-wave array of a particulate sensor, in accordance with various embodiments.

With additional reference to FIGS. 3A and 3B, a schematic diagram of a particulate sensor 300 of the particulate sensor assembly 200 is illustrated in accordance with various embodiments. Particulate sensor 300 comprises a multi-angle, multi-wave array (302, 302') of sensing elements 304 comprising a plurality of light sources and a plurality of sensing devices distributed on the sensor face 306 of housing 308. Array (302, 302') may include one or more sets of sensing elements 304 collectively configured to detect and discriminate between categories of FOD including solid objects (e.g., hand tools, hail, rain, fasteners, rocks, etc.) and particulate matter such as, for example, silicate sand, dust, volcanic ash, sea-salt aerosol, smoke, steam, water vapor, and/or the like. Sensing elements 304 may be distributed circumferentially about a center point (e.g., array 302) or may be distributed linearly and/or in a ladder pattern as shown by array 302'. As used herein, particulate matter comprises particles between about 0.01 micron to about 5000 micron where about in this context means ±5%. In various embodiments, for example, dust may be between about 0.05 micron to about 10 micron, volcanic ash may be between 0.05 micron and 2000 micron, silicate sand may be between 4 micron and 5000 micron. In various embodiments, the housing 308 comprises a protective cover over the multi-angle, multi-wave array (302, 302') tending thereby to increase the durability and longevity of the array (302, 302') when exposed to FOD and particulate matter in the engine 20 flow-paths. The protective cover may be relatively translucent to the light sources and sensing devices of the array (302, 302'). In various embodiments, the protective cover may cover each of sensing elements 304 individually or extend over multiple sensing elements 304. In various embodiments, any of the sensing elements 304 may be configured to emit a pulsed light, or a continuous light, or may be configured to receive light.

Figure 4A:
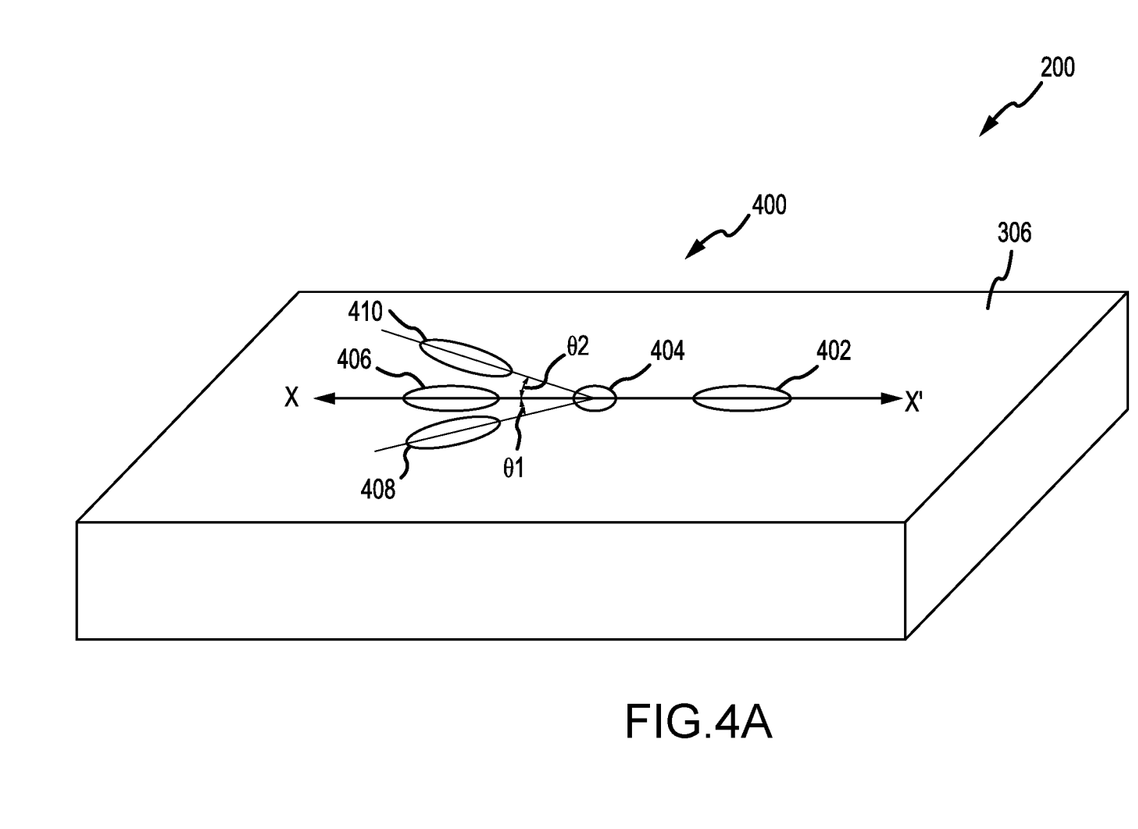
FIG. 4A illustrates a set of sensing elements for a particulate sensor, in accordance with various embodiments.

With additional reference to FIG. 4A a first set 400 sensing elements 304 of array 302 is illustrated in isolation for clarity. Set 400 includes a first light sensor 402, a second light sensor 404, and a third light sensor 406 each aligned along a common axis X-X'. The light sensors 402, 404, 406 may include, for example, photodiodes and light sensing devices such as Avalanche PhotoDiodes (APDs), Multi-Pixel Photon Counters (MPPCs), and other photodetectors. In various embodiments, common axis X-X' may parallel engine central longitudinal axis A-A' and, in this regard, may be generally aligned with direction airflow in engine 20 flow-paths. Set 400 includes a first infrared light source 408 and a first blue light source 410. The first infrared light source 408 and the first blue light source 410 may be divided by the common axis X-X' and located circumferentially about a center defined by the second light sensor 404. The first infrared light source 408 and the first blue light source 410 may define, respectively, angles θ1 and θ2 between the common axis X-X' with a vertex at a center defined by a position between any of the light sensors on the common axis. Angles θ1 and θ2 may be between 0° and 90°, or may be between 5° and 65°, or may be between 10° and 60°, and/or may be congruent. Each of the angles θ1 and θ2 may be tailored for a desired detection distance, for example, between about 1 cm to 700 cm where about in this context means ±5%. In various embodiments, the vertex of angles θ1 and θ2 may lie along the common axis X-X' at the second light sensor 404, or may between the second light sensor 404 and the first light sensor 402, or may lie at the second light sensor 402. In various embodiments, elements 402, 408, 406, 408, and 410 may lie at an angle with respect to the sensor face 306 (or common axis X-X' in a plane perpendicular to the sensor face 306). In various embodiments, elements 402, 406, 408, and 410 may be between 5° and 60° with respect to the sensor face 306 and element 404 may be between 60° and 120° with respect to the sensor face 306.

In various embodiments, the first light sensor 402 may be used to define a forward-scatter sensing detection volume formed by the overlap of the emission from the first infrared light source 408 and the first blue light source 410 having a first angle of coincidence. The first blue light source 410 may emit light between 380 nm and 600 nm (e.g., a first light). The first infrared light source 408 may emit light at a wavelength between 600 nm and 2000 nm (e.g., a second light). An angle of coincidence may be defined as the angle between the symmetry axis of an emitted light cone of a light source and a symmetry axis of an acceptance cone of a light sensor. Where the light source is pointed directly at the light sensor the angle of coincidence is 180°. It will be appreciated that a scattering angle of light may be calculated by subtracting the angle of coincidence from 180°. The first light sensor 402 may have a first scattering angle of between 0° and 60°. In like regard, the second light sensor 404 may define a mid-scatter sensing detection volume having a second scattering angle of between 60° and 120° and the third light sensor 406 may define a back-scatter sensing detection volume having a third scattering angle between 120° and 240°.

Figure 4B:
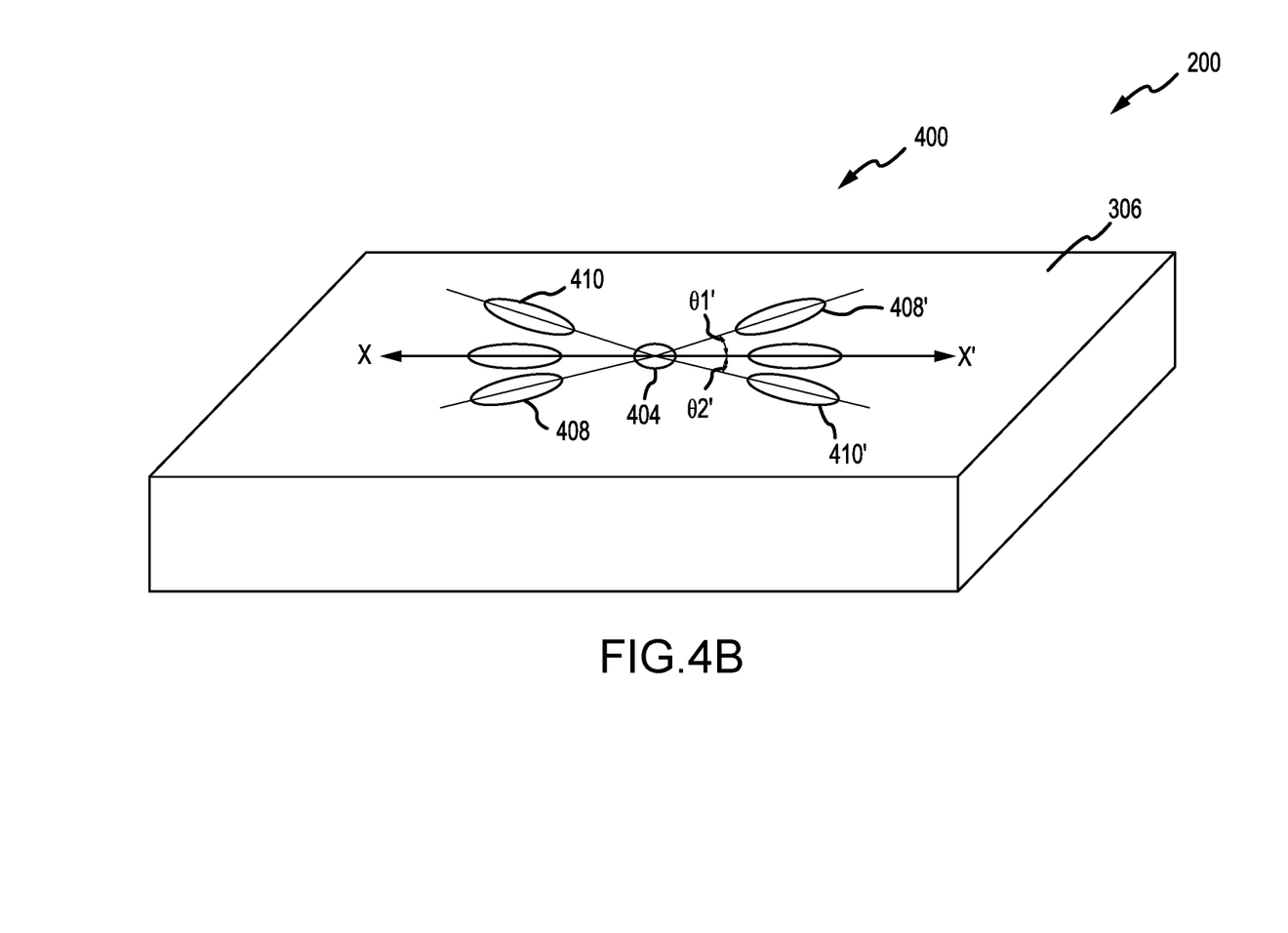
FIG. 4B illustrates a set of sensing elements for a particulate sensor, in accordance with various embodiments.

In various embodiments and with additional reference to FIG. 4B, the first set 400 of sensing elements 304 of array 302 may include a second infrared light source 408' and a second blue light source 410'. The second infrared light source 408' and the second blue light source 410' are divided by the common axis X-X' and located circumferentially about the center defined by the second light sensor 404. The second infrared light source 408' and the second blue light source 410' may define, respectively, angles θ1' and θ2' between the common axis X-X'. In various embodiments, angles θ1 and θ1' may be supplementary and, in like regard, angles θ2 and θ2' may be supplementary. The second infrared light source 408' may emit light at a wavelength between 600 nm and 2000 nm. The second blue light source 410' may emit light between 380 nm and 600 nm.

Figure 4C:
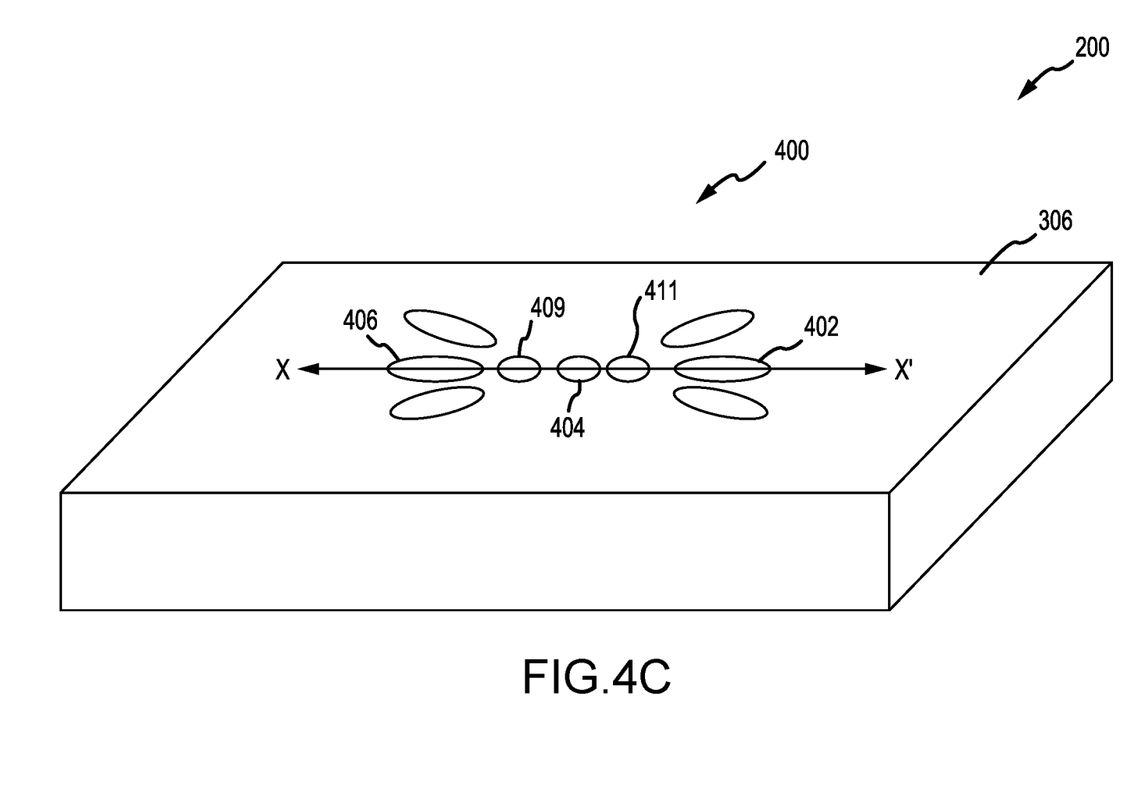
FIG. 4C illustrates a set of sensing elements for a particulate sensor, in accordance with various embodiments.

In various embodiments and with additional reference to FIG. 4C, the first set 400 of sensing elements 304 of array 302 may include a third infrared light source 409 and a third blue light source 411. The third infrared light source 409 and the third blue light source 411 may be positioned along the common axis X-X' relatively between the first light sensor 402 and the third light sensor 406. The third infrared light source 409 may emit light at a wavelength between 700 nm and 2000 nm. The third blue light source 411 may emit light between 250 nm and 700 nm. Each of the third infrared light source 409 and the third blue light source 411 may have a symmetry axis of the respective emitted light cone perpendicular to, or between 60° and 120° of, a plane defined by the sensor face 306 and or the light sensors 402, 404, 406.

Figure 5:
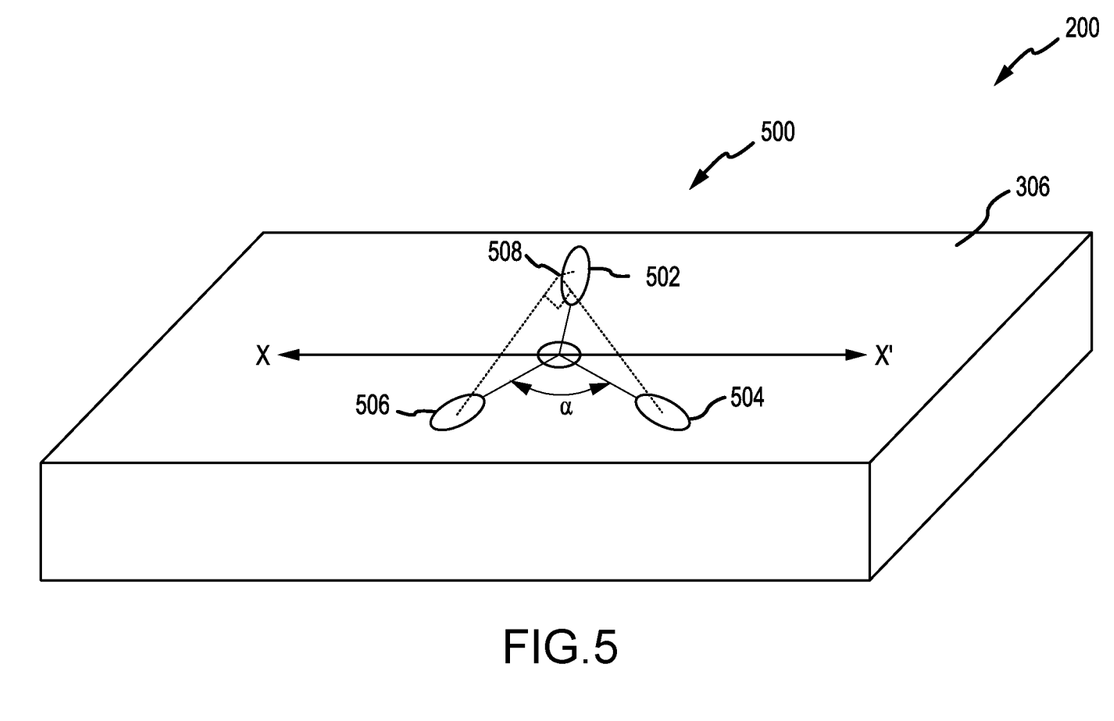
FIG. 5 illustrates a set of sensing elements for a particulate sensor, in accordance with various embodiments.

In various embodiments and with additional reference to FIG. 5, a second set 500 of sensing elements 304 of array 302 comprising at least one of a polarized light emitting element or a polarized light detecting element. It will be appreciated that set 500 may be configured for any combination of elliptical and linear polarization and may include various chirality. Second set 500 may include a first element 502, a second element 504, and a third element 506. Each of the elements (502, 504, 506) may be distributed circumferentially about a vertex 508 defined by an element light cone axis of each of the receiving and/or emitting light cones of each of the elements (502, 504, 506). In various embodiments, the vertex may be projected in the plane of sensor face 306 to the center defined by the second light sensor 404. In various embodiments, the first element 502 is an unpolarized light emitting element, the second element 504 is a S polarization detecting element, and the third element 506 is a P polarization detecting element. In various embodiments, the first element 502 is an unpolarized polarization detector, the second element 504 is a P polarized light emitting element, and the third element 506 is a S polarized light emitting element (or vice versa). The second element 504 and the third element 506 may define an angle α therebetween as a projection of the element light cone axis in the plane of sensor face 306. In various embodiments, the angle α may be 120°. In various embodiments, the element light cone axis may be elevated out of the plane of the sensor face 306 at an angle between 30° and 60°. In various embodiments, each of the vertex 508 angles defined between the element light cone axes may be orthogonal. In this regard, the second set 500 may include a V polarized light emitting element with an element light cone axis oriented at 90° to an element light cone axis of the P polarized light emitting element (e.g., respectively orthogonal beamlines). In various embodiments, any of the vertex 508 angles between the light cone axes of the elements may be ±30° from orthogonal (i.e., between 60° and 120°). The elements 502, 504, 506 may be configured to operate at wavelengths between 400 nm and 1100 nm (e.g., a fifth light). The elements 502, 504, 406 may emit a laser light characterized by coherence.

Figure 6:
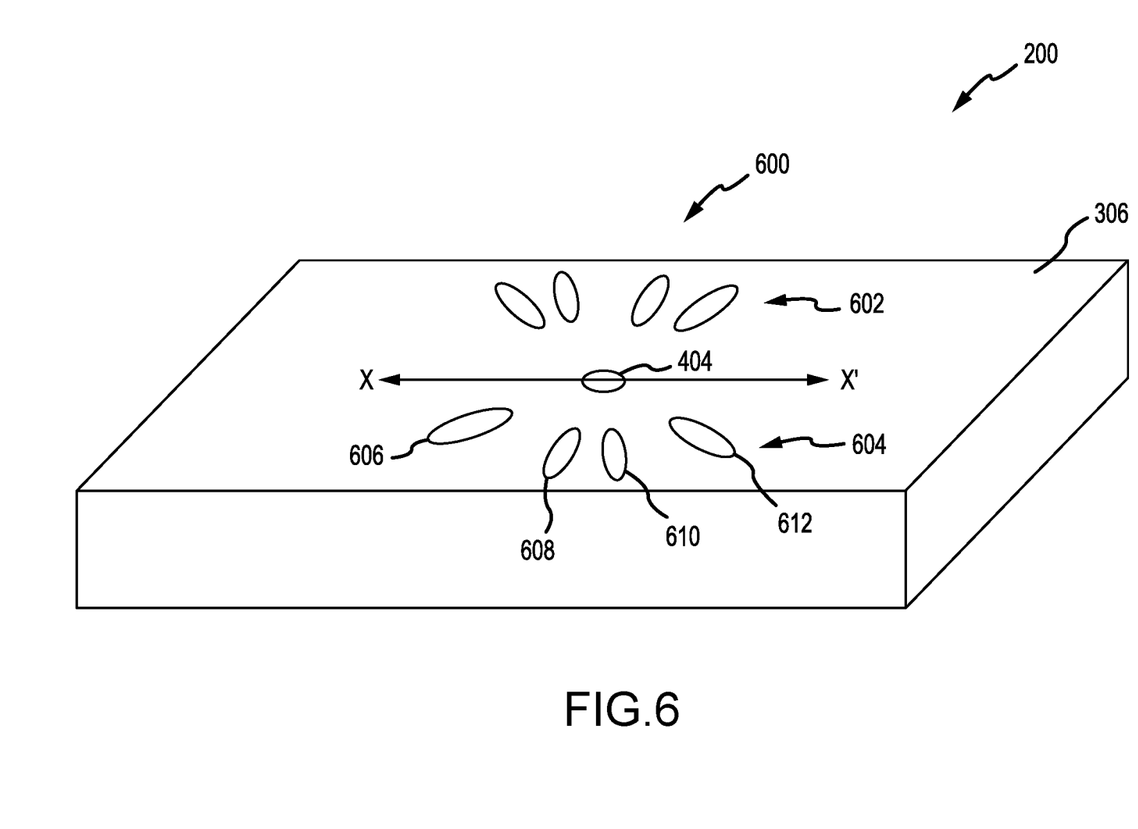
FIG. 6 illustrates a set of sensing elements for a particulate sensor, in accordance with various embodiments.

In various embodiments and with additional reference to FIG. 6, a third set 600 of sensing elements 304 of array 302 is illustrated. The third set 600 includes paired ultraviolet light emitting elements 602 and fluorescent light detecting elements 604 divided by the common axis X-X' and located circumferentially about the center defined by the second light sensor 404. The emitting element and the detecting element of the respective pair may be located relatively circumferentially 180° apart. The emitting elements 602 may be configured to emit ultraviolet light between 220 nm and 405 nm or may be between 405 nm and 900 nm (e.g., a third light). In various embodiments, the fluorescent light detecting elements may comprise one or more filters tending thereby to enable greater discrimination within the fluorescence spectra. For example, detecting elements 604 may include a first filter 606 configured between 330 nm and 370 nm, a second filter 608 configured between 370 nm and 410 nm, a third filter 610 configured between 410 nm and 450 nm, and a fourth filter 612 configured between 460 nm and 500 nm. In various embodiments, the elements 602 may include an X-ray emitting source (e.g., a fourth light) and the elements 604 may include an X-ray fluorescence detector. In various embodiments a scattering angle for a fluorescence detector may be between 5° and 180°.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A particulate sensor, comprising:
a first set of sensing elements, a second set of sensing elements, and a third set of sensing elements,
wherein the first set of sensing elements comprises a first light sensor, a second light sensor, and a third light sensor each aligned along a common axis, and
wherein the second set of sensing elements and the third set of sensing elements are arranged in at least one of circumferentially about a center defined by the second light sensor or in a ladder pattern.

2. The particulate sensor of claim 1, wherein the first set of sensing elements further comprises a first infrared light source and a first blue light source,
wherein the first infrared light source and the first blue light source are each divided by the common axis and located circumferentially about the center defined by the second light sensor, and
wherein the first infrared light source and the first blue light source define, respectively, an angle θ1 and an angle θ2 between the common axis.

3. The particulate sensor of claim 2, further comprising a second infrared light source and a second blue light source, wherein the second infrared light source and the second blue light source are each divided by the common axis and located circumferentially about the center defined by the second light sensor, and
wherein the second infrared light source and the second blue light source define, respectively, an angle θ1' supplementary to the angle θ1 and an angle θ2' supplementary to the angle θ2.

4. The particulate sensor of claim 2, further comprising a third infrared light source and a third blue light source aligned along the common axis, wherein each of the third infrared light source and the third blue light source have a symmetry axis of a respective emitted light cone perpendicular to a plane defined by the first light sensor, the second light sensor, and the third light sensor.

5. The particulate sensor of claim 2, wherein the second set of sensing elements comprises at least one of a polarized light emitting element or a polarized light detecting element configured to operate at a wavelength between 400 nm and 2000 nm.

6. The particulate sensor of claim 2, wherein the third set of sensing elements comprises a first ultraviolet light emitting element and a first fluorescent light detecting element.

7. The particulate sensor of claim 6, further comprising an X-ray emitting source and an X-ray fluorescence detector.

8. A particulate sensor assembly, comprising:
a housing having a sensor face; and
a particulate sensor comprising a first set of sensing elements, a second set of sensing elements, and a third set of sensing elements each distributed on the sensor face,
wherein the first set of sensing elements comprises a first light sensor, a second light sensor, and a third light sensor each aligned along a common axis, and
wherein the second set of sensing elements and the third set of sensing elements are arranged at least one of circumferentially about a center defined by the second light sensor or in a ladder pattern.

9. The particulate sensor assembly of claim 8, wherein the first set of sensing elements comprises a first infrared light source and a first blue light source,
wherein the first infrared light source and the first blue light source are each divided by the common axis and located circumferentially about the center defined by the second light sensor, and
wherein the first infrared light source and the first blue light source define, respectively, an angle θ1 and an angle θ2 between the common axis.

10. The particulate sensor assembly of claim 9, further comprising a second infrared light source and a second blue light source, wherein the second infrared light source and the second blue light source are each divided by the common axis and located circumferentially about the center defined by the second light sensor, and wherein the second infrared light source and the second blue light source define, respectively, an angle $\theta1'$ supplementary to the angle $\theta1$ and an angle $\theta2'$ supplementary to the angle $\theta2$.

11. The particulate sensor assembly of claim 9, further comprising a third infrared light source and a third blue light source aligned along the common axis, wherein each of the third infrared light source and the third blue light source have a symmetry axis of a respective emitted light cone perpendicular to a plane defined by the sensor face.

12. The particulate sensor assembly of claim 9, wherein the second set of sensing elements comprises at least one of a polarized light emitting element or a polarized light detecting element configured to operate at a wavelength between 400 nm and 2000 nm.

13. The particulate sensor assembly of claim 9, wherein the third set of sensing elements comprises a first ultraviolet light emitting element and a first fluorescent light detecting element.

14. The particulate sensor assembly of claim 9, further comprising an X-ray emitting source and an X-ray detector.

15. A gas turbine engine, comprising:
a compressor section configured to compress a gas;
a combustor section aft of the compressor section and configured to combust the gas;
a turbine section aft of the combustor section and configured to extract work from the gas;
and a particulate sensor assembly configured to observe a sensing volume of a flow-path of the gas, comprising:
a housing having a sensor face; and
a particulate sensor comprising a first set of sensing elements, a second set of sensing elements, and a third set of sensing elements each distributed on the sensor face, wherein the first set of sensing elements comprises a first light sensor, a second light sensor, and a third light sensor each aligned along a common axis, and wherein the second set of sensing elements and the third set of sensing elements are arranged at least one of circumferentially about a center defined by the second light sensor or in a ladder pattern.

16. The gas turbine engine of claim 15, further comprising an engine static structure having a lip defining an inlet, wherein the particulate sensor assembly is coupled to the engine static structure proximate the lip to observe a first sensing volume defining an inlet ingestion sensing region of the gas turbine engine.

17. The gas turbine engine of claim 16, wherein the engine static structure further defines a bypass duct, wherein the particulate sensor assembly is coupled to the engine static structure to observe a second sensing volume within a bypass flow-path proximate an inlet of the bypass duct.

18. The gas turbine engine of claim 15, wherein the first set of sensing elements further comprises a first infrared light source and a first blue light source, wherein the first infrared light source and the first blue light source are each divided by the common axis and located circumferentially about the center defined by the second light sensor, and wherein the first infrared light source and the first blue light source define, respectively, an angle $\theta1$ and an angle $\theta2$ between the common axis.

19. The gas turbine engine of claim 18, wherein the second set of sensing elements comprises at least one of a polarized light emitting element or a polarized light detecting element configured to operate at a wavelength between 400 nm and 2000 nm.

20. The gas turbine engine of claim 19, wherein the third set of sensing elements comprises a first ultraviolet light emitting element and a first fluorescent light detecting element.

* * * * *